(12) United States Patent
Thibault

(10) Patent No.: US 8,393,209 B2
(45) Date of Patent: Mar. 12, 2013

(54) CAPACITIVE DETECTOR, METHOD FOR MANUFACTURING SAME, AND DEVICE FOR MEASURING THE INTEGRAL

(75) Inventor: Pierre Thibault, Saint Martin d'Uriage (FR)

(73) Assignee: Universite Joseph Fourier, Saint Martin d'Uriage (FR)

( * ) Notice: Subject to any disclaimer, the term of this patent is extended or adjusted under 35 U.S.C. 154(b) by 291 days.

(21) Appl. No.: 12/936,153

(22) PCT Filed: Mar. 12, 2009

(86) PCT No.: PCT/FR2009/050407
§ 371 (c)(1),
(2), (4) Date: Dec. 20, 2010

(87) PCT Pub. No.: WO2009/122061
PCT Pub. Date: Oct. 8, 2009

(65) Prior Publication Data
US 2011/0107833 A1    May 12, 2011

(30) Foreign Application Priority Data
Apr. 4, 2008    (FR) ...................................... 08 52271

(51) Int. Cl.
  *G01F 23/26* (2006.01)
  *G08B 21/00* (2006.01)
(52) U.S. Cl. ..................................... 73/304 C; 340/603
(58) Field of Classification Search ................. 73/290 R, 73/304 C; 340/603
See application file for complete search history.

(56) References Cited

U.S. PATENT DOCUMENTS

| | | | |
|---|---|---|---|
| 2003/0058514 A1* | 3/2003 | Kruschwitz et al. | 359/230 |
| 2006/0265155 A1* | 11/2006 | Goldfine et al. | 702/57 |

* cited by examiner

*Primary Examiner* — Hezron E Williams
*Assistant Examiner* — David Z Huang
(74) *Attorney, Agent, or Firm* — Meyertons, Hood, Kivlin, Kowert & Goetzel, P.C.; Eric B. Meyertons

(57) ABSTRACT

Capacitive detector and measuring device integrating it; the detector including: a ribbon made of a dielectric material, first and second electrodes in the form of combs formed on a first surface of said ribbon and a third electrode formed on the other surface of said ribbon opposite said first and second electrodes; the thickness (e) of the dielectric ribbon is less than or equal to said determined period ($\lambda$) divided by four times PI, i.e.: $\lambda/4\pi \geq e$; and the ratio resulting from the division, as numerator, of the capacitance (C) between two adjacent branches of said first and second electrodes in the presence of at least one fluid with a dielectric permittivity ($\in_f$) and, as denominator, by the dielectric permittivity ($\in_f$) of the fluid multiplied by the capacitance ($C_o$) between the two adjacent branches of the first and second electrodes in the presence of the vacuum is greater than or equal to one, i.e.: $C/(\in_f {}^* C_o) \geq 1$. Method for manufacturing a detector fulfilling the above conditions.

4 Claims, 2 Drawing Sheets

CAPACITIVE DETECTOR, METHOD FOR MANUFACTURING SAME, AND DEVICE FOR MEASURING THE INTEGRAL

BACKGROUND OF THE INVENTION

1. Field of the Invention

The present invention relates to the domain of measurements of the level of fluids or of the thickness of films of fluid or of the presence of fluids.

2. Description of the Relevant Art

It is known to implement capacitive detectors which include, on a surface of a relatively thick isolating ribbon, two electrodes in the form of combs whose branches are arranged alternately between one another, or interdigitated, and, on the other surface, a ground electrode. It is known that the presence of the ground electrode, by means of a three-wire measure, allows the sensitivity of the device to be increased and the device to be protected from external interferences. Generally, it is considered that the capacitance between the interdigitated electrodes of a device of this type is the sum of a dielectric contribution inside the ribbon and of another dielectric contribution on the external part of the plane of the electrodes, originating from the vacuum or from a fluid.

SUMMARY OF THE INVENTION

It is desirable to increase the sensitivity of capacitive detectors by acting on the passage conditions of the electrical field, notably in the plane of the electrodes in the form of combs.

Embodiments described herein are directed to a capacitive detector.

According to an embodiment, this capacitive detector includes:
 a ribbon made of a dielectric material;
 at least one pair of electrodes including a first electrode in the form of a comb formed on a first surface of said ribbon and including parallel transverse branches interconnected by a longitudinal connection branch and a second electrode in the form of a comb formed on said first surface of said ribbon and including parallel transverse branches interconnected by a longitudinal connection branch, the transverse branches of said first and second electrodes being arranged alternately between one another according to at least one determined period ($\lambda$);
 and a third electrode in the form of a layer formed on the other surface of said ribbon with a dielectric permittivity ($\in$) opposite said first and second electrodes.

According to an embodiment, the thickness (e) of the dielectric ribbon is less than or equal to said determined period ($\lambda$) divided by four times PI, i.e.: $\lambda/4\pi \geq e$.

According to an embodiment, the ratio resulting from the division, as numerator, of the capacitance (C) between two adjacent branches of said first and second electrodes in the presence of at least one fluid with a dielectric permittivity ($\in_f$) and, as denominator, by the dielectric permittivity ($\in_f$) of the fluid multiplied by the capacitance ($C_o$) between the two adjacent branches of the first and second electrodes in the presence of the vacuum is greater than or equal to one, i.e.: $C/(\in_f{}^*C_o) \geq 1$.

Embodiments are also directed to a device for measuring the level of a fluid or the thickness of a film of fluid.

In an embodiment, a measuring device includes: the above capacitive detector and a means for measuring the capacitance between said first and second electrodes.

Embodiments are also directed to a method for manufacturing a capacitive detector.

According to an embodiment, this method includes:
 deposition of layers of an electrically conducting material on the two surfaces of a ribbon made of a dielectric material;
 etching of one of the layers in order to implement at least one pair of electrodes including a first electrode in the form of a comb and including parallel transverse branches interconnected by a longitudinal connection branch and a second electrode in the form of a comb and including parallel transverse branches interconnected by a longitudinal connection branch;
 the transverse branches of said first and second electrodes being arranged alternately between one another according to at least one determined period ($\lambda$);
 the layer formed on the other surface of said dielectric ribbon forming a third electrode;
 said dielectric ribbon and said first and second electrodes being chosen in such a way that:
  the thickness (e) of the dielectric ribbon is less than or equal to said determined period ($\lambda$) divided by four times PI, i.e.: $\lambda/4\pi \geq e$;
  and the ratio resulting from the division, as numerator, of the capacitance (C) between two adjacent branches of said first and second electrodes in the presence of at least one fluid with a dielectric permittivity ($\in_f$) and, as denominator, by the dielectric permittivity ($\in_f$) of the fluid multiplied by the capacitance ($C_o$) between the two adjacent branches of the first and second electrodes in the presence of the vacuum is greater than or equal to one, i.e.: $C/(\in_f{}^*C_o) \geq 1$.

According to an embodiment, the electrodes may be covered with a protective layer.

The detector allows the fading of the electrical field lines in the ribbon made of dielectric material to be reduced considerably, and also allows a stronger electrical field to be obtained between the branches of the first and second electrodes, resulting in increased sensitivity.

BRIEF DESCRIPTION OF THE DRAWINGS

The present invention will be better understood by examining capacitive detectors described by way of examples, as shown in the attached drawing, in which.

Figure 1:
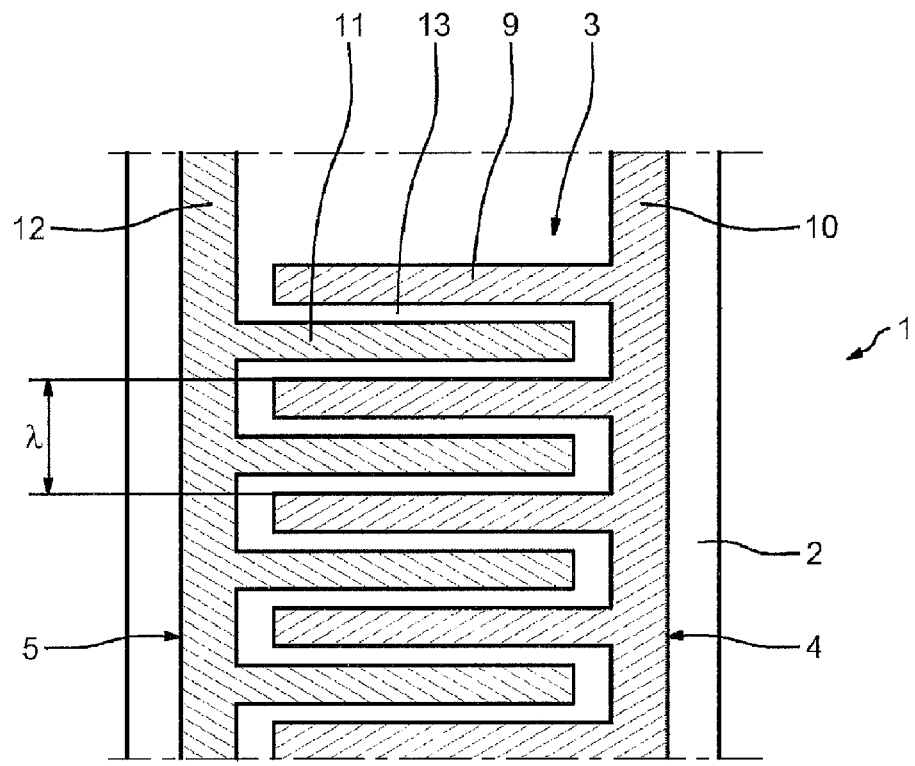
FIG. 1 shows a top view of a capacitive detector according to the invention.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

Figure 2:
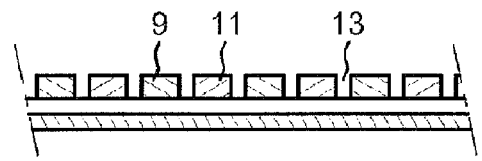
FIG. 2 shows a longitudinal section of the capacitive detector shown in FIG. 1.
Figure 3:
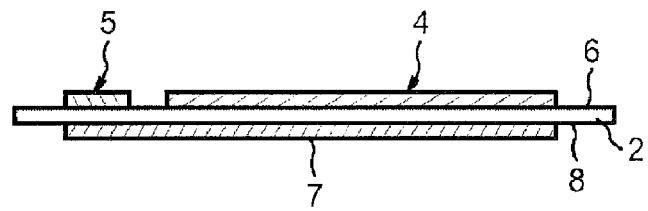
FIG. 3 shows a cross-section of the capacitive detector shown in FIG. 1.

The capacitive detector 1, shown in FIGS. 1, 2 and 3, includes a longitudinal ribbon 2 made of a, for example, flexible dielectric material, a pair 3 of electrodes including a first electrode 4 and a second electrode 5 formed on a surface 6 of the dielectric ribbon 2, and a third electrode 7 formed on the other surface 8 of the dielectric ribbon 2.

The first electrode 4 is in the shape of a comb and includes parallel transverse branches 9, regularly spaced and interconnected by a longitudinal connection branch 10.

The second electrode 5 is in the shape of a comb and includes parallel transverse branches 11, regularly spaced and interconnected by a longitudinal connection branch 12.

The transverse branches 9 and 11 of the first and second electrodes 4 and 5 are arranged alternately between one another, have equal widths and equal lengths and are regularly spaced, the transverse branches 9 extending towards the longitudinal connection branch 12 and the parallel transverse branches 11 extending towards the longitudinal connection branch 10. An arrangement of this type is often referred to as an interdigitated structure.

Thus, the transverse branches 9 and 11 are arranged according to a determined period which includes the addition of a width of the branches 9 of the electrode 4, a width of the branches 11 of the electrode 5 and two spaces 13 between two adjacent branches 9 and 11.

The third electrode 7 is in the form of a layer opposite the first and second electrodes 4 and 5.

The following method can be adopted in order to manufacture the capacitive detector 1.

A ribbon is taken, made of a dielectric material, for example a plastic material such as a polyimide, for example Kapton, or polytetrafluoroethylene (Teflon).

Layers of an electrically conducting material, for example a metal material such as copper or gold, are deposited on the opposite surfaces of a ribbon of this type. These layers may completely cover the surfaces of the ribbon, or may form longitudinal bands whose edges are distant from the edges of the ribbon.

One of the deposited layers is then etched in order to implement the first electrode and the second electrode 4 and 5 as defined above.

The dielectric ribbon 2 and the first and second electrodes 4 and 5 are chosen in such a way as to fulfill the following two criteria.

(1) The thickness (e) of the dielectric ribbon 2 is less than, preferably much less than, or equal to said determined period $\lambda$ divided by four times PI,
i.e.: $\lambda/4\pi \geqq e$.

(2) the ratio resulting from the division, as numerator, of the capacitance (C) between two adjacent transverse branches 9 and 11 of the first and second electrodes 4 and 5 in the presence of a dielectric fluid with a dielectric permittivity ($\in_f$) and, as denominator, by the dielectric permittivity ($\in_f$) of the fluid multiplied by the capacitance ($C_o$) between the adjacent transverse branches 9 and 11 of the first and second electrodes 4 and 5 in the presence of the vacuum is greater than or equal to one, i.e.: $C/(\in_f{}^* C_o) \geqq 1$.

In so far as the above criteria, in relation to the dielectric permittivity ($\in_f$) of the fluid, are fulfilled, the sensitivity of the detector 1 is optimal relative to the dielectric constant of the fluid for which it is intended.

Figure 4:
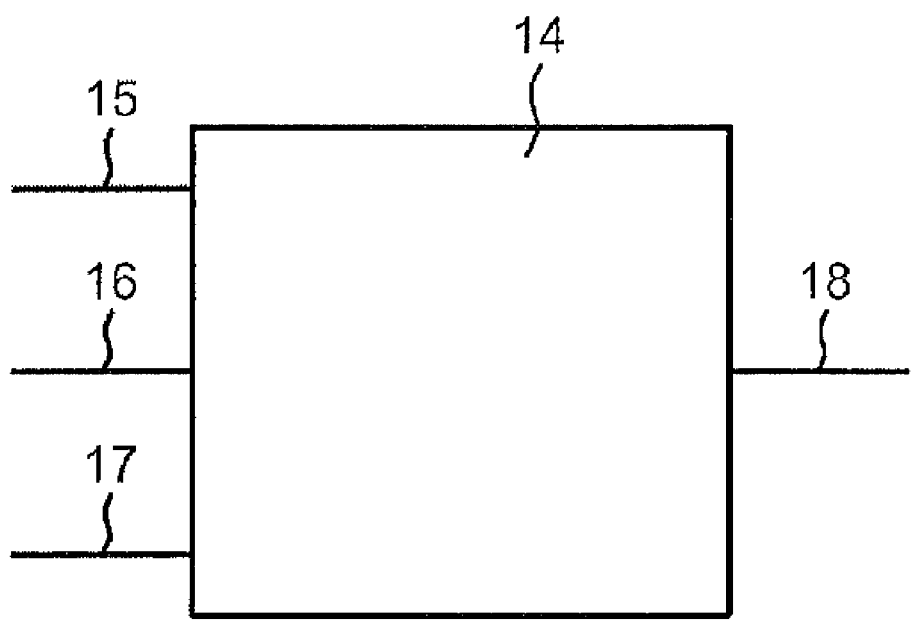
FIG. 4 shows an electronic diagram of an electronic circuit to which the aforementioned detector is connected.

With reference to FIG. 4, it can be seen that respectively the first and second electrodes 4 and 5 and the third electrode 7 are connected to an electronic circuit 14 via three electrical wires 15, 16 and 17.

For example, the ends of these wires may be fixed to an end of the detector 1, on end zones of the first and second electrodes 4 and 5 and on an end zone of the third electrode 7 disposed on the surface 6 of the band 2 between the end zones of the first and second electrodes 4 and 5, skirting the end of this band 2.

The electronic circuit 14 may include an excitation source to charge the first series of electrodes of the branch A via a signal on the electrode 15 with reference to a potential carried by the electrode 17. The electronic circuit may have a device for measuring the mutual capacitance between the electrode 15 and the electrode 16. The electrode 16 is referenced in relation to the electrode 17 and the device 14 ensures that the potentials of the electrodes 16 and 17 are identical.

The electrode 17 serving as a reference, the measuring device is thus a so-called 3-terminal device, and may instigate a measurement by means of a bridge, known as a Blumlein bridge, in a non-limiting manner. At its output 18, the electronic circuit 14 supplies a signal relating to the measurement of the mutual capacitance between the electrodes 15 and 16.

The detector 1 may be used in different applications, notably in the following applications. According to one example, the detector 1 may be used to measure the level of a liquid in this reservoir or in a conduit, by being, for example, suspended or fixed to the wall, the first and second electrodes 4 and 5 being turned towards the inside, with possible interposition of an isolator. In this case, the electronic circuit 14 supplies at its output 18 a signal relating to the measurement of the mutual capacitance between the electrodes 15 and 16, the variation of which is proportional to the length immersed in the liquid.

According to a different example, the detector 1 can be used to measure the thickness of a film of a liquid covering it. In this case, the electronic circuit 14 supplies at its output 18 a signal relating to the measurement of the mutual capacitance between the electrodes 15 and 16, which varies with the thickness of this film, while this thickness remains less than an asymptotic value. The case of a dielectric medium whose thickness is less than or comparable to the length $\lambda$ results in a measurement of the capacitance which depends singly and increasingly on the thickness of the film of fluid.

It is noteworthy that, the higher the dielectric permittivity $\in_f$ of the fluid, the greater the sensitivity of the detector 1 defined by the preceding ratio relative to the unit value.

According to a different example, the detector 1 may be placed inside a conduit or an enclosure containing at least two dielectric media, possibly in motion, for example two liquids, one liquid and one gas, or two gases. The detector 1 being covered for one part (x) of its surface with a first medium with a dielectric permittivity ($\in_1$) and, for another part (1−x), with a second dielectric medium with an electrical permittivity ($\in_2$), which may be the vacuum, the capacitance between the first and second electrodes 4 and 5 is proportional and such that $C=xC_1+(1-x)C_2$, the capacitance ($C_1$) being that of said detector entirely covered with the first medium, and the capacitance ($C_2$) being that of said detector entirely covered with the second medium. In this case, the electronic circuit 14 supplies at its output 18 a capacitance signal representing the ratio of the surfaces of the detector 1 respectively covered by one of the fluids and the other.

According to a different example, the detector 1 can be used to detect the appearance of a fluid determined on its front surface 6, for example the appearance of a vapor film on a heated surface. In this case, the electronic circuit 14 supplies at its output 18 a capacitance signal comparatively to a threshold.

Examples of the configuration of the detector 1 will now be proposed by way of illustration.

In the case where the fluid is liquid nitrogen whose dielectric permittivity $\in_f$ is equal to 1.46, i.e. $\in_f=1.46$, the detector 1 can be chosen in the following manner.

The width of the transverse branches 9 and 11 of the first and second electrodes 4 and 5 may be equal to 300 μm and the space separating two adjacent transverse branches may be equal to 150 μm, in such a way that the period λ is equal to 900 μm, the distance between the ends of the transverse branches 9 and 11 and respectively the longitudinal branches 10 and 12 also being equal to 150 μm.

The length of the transverse branches 9 and 11 may be between two and ten times the space separating them, for example five times. In particular, this length may be between 2 and 10 mm.

The thickness of the branches of the first and second electrodes 4 and 5 and the thickness of the third electrode may be 17.5 μm.

Thus, $\lambda/4\pi$ is equal to around 143 μm, a figure which is significantly greater than the 25 μm of thickness of the dielectric ribbon 2.

The dielectric permittivity $\in$ of the polyimide plastic forming said ribbon is more or less equal to 3.4.

The capacitance $C_o$ between the two adjacent transverse branches 9 and 11 of the first and second electrodes 4 and 5 in the presence of the vacuum is more or less equal to 5.62 pF/m.

The capacitance (C) between two adjacent transverse branches 9 and 11 of the first and second electrodes 4 and 5 in the presence of liquid nitrogen is more or less equal to 8.51 pF/m. Thus, the ratio $C/(\in_f{}^*C_o)$ is more or less equal to 1.037, a figure which is greater than one.

An extension of the above example may be applied to a fluid such as toluene, whose dielectric constant $\in_f=2.38$ under atmospheric conditions. Thus, the ratio $C/(\in_f{}^*C_o)$ is more or less equal to 1.103, a figure which is greater than one.

In the case where the detector 1 is intended to detect a uniform film of liquid nitrogen, relative thicknesses of 50, 100, 200, 400 μm, or infinity, give capacitances C of 6.77; 7.58; 8.27; 8.45; or 8.51 pF/m.

According to one variant, the surfaces of the detector 1 can be covered with fine protective layers of a dielectric material.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A capacitive detector comprising:
    a ribbon made of a dielectric material;
    at least one pair of electrodes including a first electrode in the form of a comb formed on a first surface of said ribbon and including parallel transverse branches interconnected by a longitudinal connection branch and a second electrode in the form of a comb formed on said first surface of said ribbon and including parallel transverse branches interconnected by a longitudinal connection branch, the transverse branches of said first and second electrodes being disposed alternately between one another according to at least one determined period ($\lambda$);
    and a third electrode in the form of a layer formed on the other surface of said ribbon opposite said first and second electrodes;
    wherein
    the thickness (e) of the dielectric ribbon is less than or equal to said determined period ($\lambda$) divided by four times PI;
    and that the ratio resulting from the division, as numerator, of the capacitance (C) between two adjacent branches of said first and second electrodes in the presence of at least one fluid with a dielectric permittivity ($\in_f$) and, as denominator, by the dielectric permittivity ($\in_f$) of the fluid multiplied by the capacitance ($C_o$) between the two adjacent branches of the first and second electrodes in the presence of the vacuum is greater than or equal to one.

2. The capacitive detector according to claim 1, in which the electrodes are covered with a protective layer.

3. A device for measuring the level of a fluid or the thickness of a film of fluid comprising a capacitive detector according to claim 1; and a means for measuring the capacitance between said first and second electrodes.

4. A method for manufacturing a capacitive detector, comprising:
    deposition of layers of an electrically conducting material on the two surfaces of a ribbon made of a dielectric material;
    etching of one of the layers in order to implement at least one pair of electrodes comprises a first electrode in the form of a comb and including parallel transverse branches interconnected by a longitudinal connection branch and a second electrode in the form of a comb and including parallel transverse branches interconnected by a longitudinal connection branch;
    the transverse branches of said first and second electrodes being disposed alternately between one another according to at least one determined period ($\lambda$);
    the layer formed on the other surface of said dielectric ribbon forming a third electrode;
    said dielectric ribbon and said first and second electrodes being chosen in such a way that:
        the thickness (e) of the dielectric ribbon is less than or equal to determined period ($\lambda$) divided by four times PI;
        and the ratio resulting from the division, as numerator, of the capacitance (C) between two adjacent branches of said first and second electrodes in the presence of at least one fluid with a dielectric permittivity ($\in_f$) and, as denominator, by the dielectric permittivity ($\in_f$) of the fluid multiplied by the capacitance ($C_o$) between the two adjacent branches of the first and second electrodes in the presence of the vacuum is greater than or equal to one.

* * * * *